United States Patent [19]

Chiang

[11] 4,418,183

[45] Nov. 29, 1983

[54] METHOD FOR THE PRODUCTION OF HIGH CONCENTRATIONS OF EMULSION POLYMERS

[75] Inventor: Albert C. Chiang, Danbury, Conn.

[73] Assignee: Pitney Bowes Inc., Stamford, Conn.

[21] Appl. No.: 320,360

[22] Filed: Nov. 12, 1981

[51] Int. Cl.³ .............................................. C08F 2/24
[52] U.S. Cl. .................................. 526/80; 524/458; 524/460; 526/87
[58] Field of Search ................... 526/80, 87; 524/458, 524/460

[56] References Cited

U.S. PATENT DOCUMENTS

| | | | |
|---|---|---|---|
| 3,547,857 | 12/1970 | Murray | 524/458 |
| 4,123,405 | 10/1978 | Oyamada | 526/80 |
| 4,246,156 | 1/1981 | Heins | 524/460 |
| 4,254,004 | 3/1981 | Abbey | 526/80 |
| 4,267,090 | 5/1981 | Heimberg | 524/460 |

*Primary Examiner*—Paul R. Michl
*Attorney, Agent, or Firm*—Melvin J. Scolnick; Albert W. Scribner; William D. Soltow, Jr.

[57] ABSTRACT

A process for the preparation of emulsion polymers having a solid content of about 65% to about 80% is disclosed. The process comprises the step of adding a monomeric mixture to a reaction system maintained at a temperature of from about 60° C. to about 90° C., the monomer addition not exceeding an hourly rate of about one-fourth of the total monomer to be added, the mixture comprising monomers having a particle size of from about 10–100 microns, the system having therein an emulsifier and initiator at the time of the monomeric addition.

12 Claims, 4 Drawing Figures

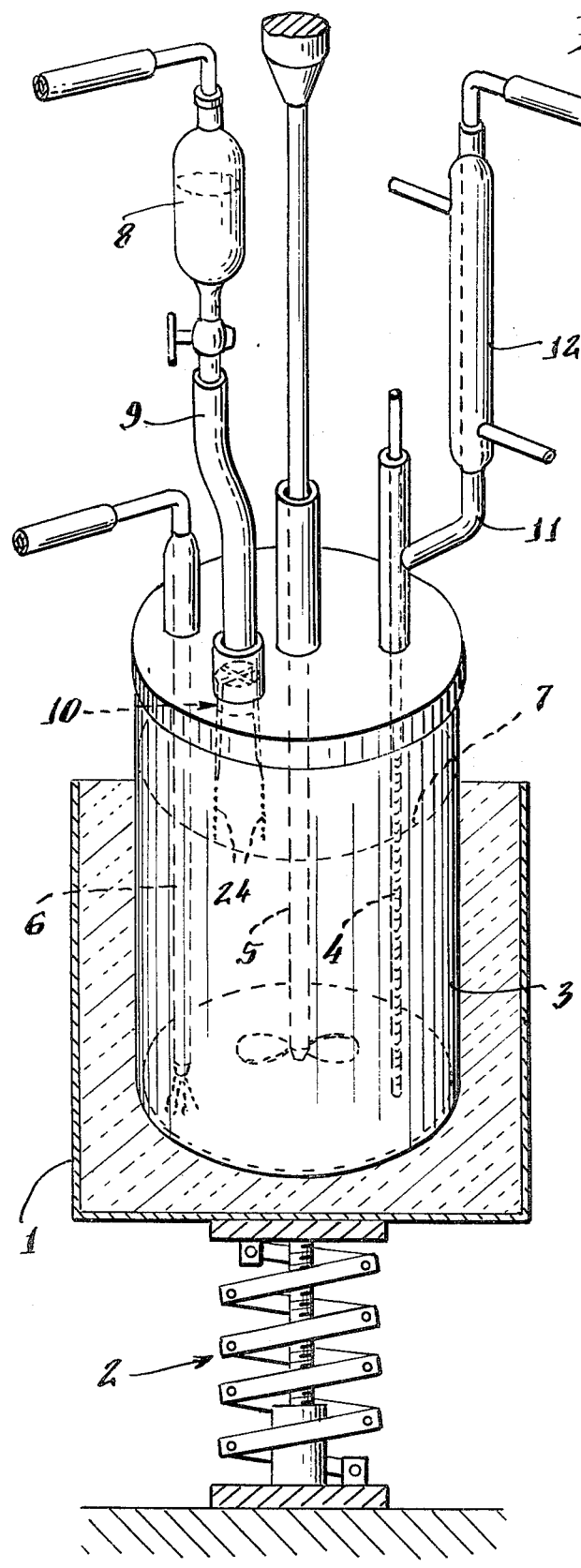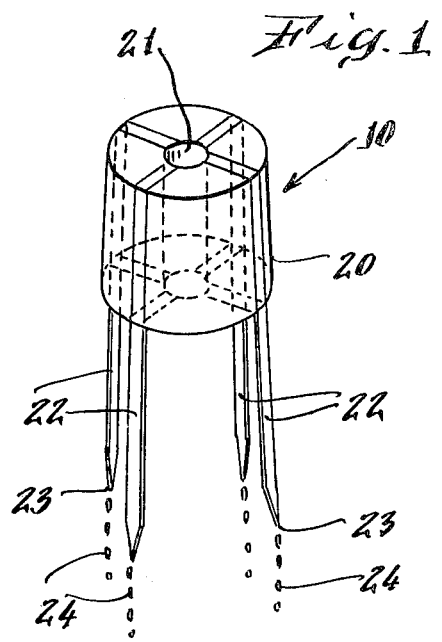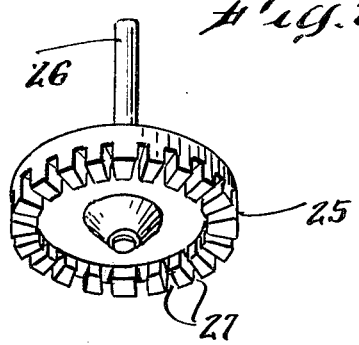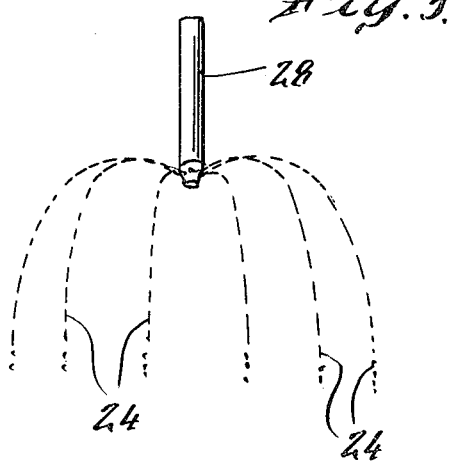

METHOD FOR THE PRODUCTION OF HIGH CONCENTRATIONS OF EMULSION POLYMERS

BACKGROUND OF THE INVENTION

It is known that various polymerization techniques may be used commercially in the production of selected polymeric materials. In many instances it is desirable to avoid the use of organic solvents in these production methods. Polymers prepared in aqueous mediums are favored in many industries because of their relatively low cost, ease of handling, and reduced low environmental problems. There are many instances however where it is required to attain a high solubility of the polymetric material in the reaction medium; however, since the solubility of polymers in aqueous solutions is generally low, aqueous mediums are not acceptable in these instances.

To fill the requirements of high polymer solubility together with relatively low cost, ease of handling and reduced environmental problems, emulsion polymerization has been used. In emulsion polymerization, the polymeric particles are generally homogeneously distributed in the water phase and therefore permit a higher concentration to be attained during the reaction. It is desirable in several industries to attain very high polymeric concentrations because of final product yield requirements. Such industries include toner preparation for office copiers, paint compositions, printing inks, photographic emulsions, adhesive products and cosmetic products. The commercially available emulsion polymerization methods used today generally yield weight percentage of solid contents in the 10% to 65% range. While the high end of this range could be marginally acceptable for some of the above rated industries, generally the emulsion polymerization procedures used are not adequate when a high solid content is needed. One of the reasons for this lack of high solid content, is because of the instability of the oil-in-water micelles and the difficulty of the heat transfer during the exothermic polymerization.

As noted above the presently available aqueous and emulsion polymerization methods have serious drawbacks in industries where high concentration of polymer is required.

This invention relates to an emulsion polymerization process for the preparation of high concentrations of polymers, homopolymers, copolymers, terpolymers and tetrapolymers. To solve the above noted problems of prior art emulsion polymerization methods, the present invention utilizes very small drop size of monomers during the monomeric addition steps.

The amount of emulsifier should be added in an amount of about 6%-10% of the total monomer to be added in the process. Thus, if 100 grams of monomer is to be ultimately added, from 6 to 10 grams of emulsifier should be added and slow heat dissipation should be maintained. Thus, the present invention, provides a novel method for attaining solid content concentrations of emulsion polymers ranging from about 65% to about 80% by weight of the emulsion.

SUMMARY OF THE INVENTION

It is therefore an object of this invention to provide an emulsion polymerization process devoid of the above noted disadvantages.

Another object of this invention is to provide an emulsion polymerization process wherein a high polymeric concentration is easily attainable.

A further object of this invention is to provide a process for the production of polymers wherein very high concentrations are obtained via a relatively uncomplicated and safe process.

Another further object of this invention is to provide an economical process for the production of polymers useful in toner manufacture.

Still another object of this invention is to provide an environmentally safe process for the production of polymers useful in the paint, printing, photographic, adhesive products and cosmetic industries.

The foregoing objects and others are accomplished in accordance with this invention by providing a novel method for the production of polymers which comprises utilizing an emulsion polymerization system wherein small size monomers are slowly added to the reaction medium at very controlled temperatures. It is also important to this invention that the proper amount of emulsifiers be used for maximum results. By "small size" monomers is meant monomers having a particle size of from about 10 microns to about 100 microns however larger sizes up to 1000 microns could be used. By "slowly added" is meant an addition of monomer to the reaction medium of no more than one forth to about one sixth of the total monomer to be finally added, hour per hour. The preferred reaction temperature is from about 65° C. to about 80° C. however 60° C. to about 90° C. could be used. The present invention is particularly suitable for the production of Acrylate and Vinyl type polymers.

Any suitable monomer may be used in the process of this invention, typical monomers are those having the general formula:

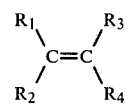

wherein $R_1$ and $R_2 = H$ $R_3 = H$ or $CH_3$ $R_4 = COOR$; $COOCH_2OH$, CN, $C_6H_5$, OR—CH—$C_6H_5$ where R' has a carbon number of from 0–8.

Typical monomers useful in this invention are:

A. acrylic acid 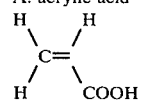

B. n-butyl acrylate 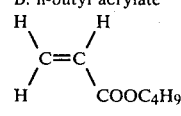

C. isobutyl acrylate

D. acryloamide 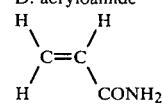

E. Vinyl acetate 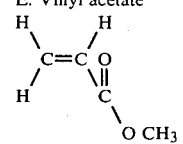

F. glycidyl methacrylate

-continued

G. ethyl acrylate

H₂C=CH—COOC₂H₅

H. acrylonitrile

H₂C=CH—CN

I. Vinyl toluene

H₂C=CH—O—CH₃

J. 2-hydroxyethyl acrylate (structure with C=C, C—O—C—CH with OH)

K. Styrene

H₂C=CH—C₆H₄—O (phenyl)

L. 2-methoxyethylacrylate (structure with C=C, C=O, O—C—C—OCH₃)

Monomers useful in this invention include 2-hydrothyl methacrylate, methacrylic acid, n-butyl methacrylic acid, isobutyl methacrylate, ethyl methacrylate, n-propyl acrylate, isopropyl acrylate, pentyl acrylate, n-propyl methacrylate, isopropyl methacrylate, pentyl methacrylate, stearyl methacrylate, lauryl methacrylate, lauryl acrylate, stearyl acrylate, isodecyl methacrylate, isodecyl acrylate, hydropropyl methacrylate, hydropropyl acrylate, t-butylaminoethyl methacrylate, t-butyaminoethyl acrylate, 2-ethyldexyl acrylate and mixtures thereof.

Any suitable emulsifier may be used, typical emulsifiers are Triton x-305, Triton x-405, Triton CF-32, Triton-200, Triton-301 and Triton 25-44; Triton is a registered trademark of Rohm and Haas Company. Tritons are surface active agents generally described as nonionic alkylphenyl polyether alcohols. They have the general formula:

$$CH_3-C(CH_3)_2-CH_2-C(CH_3)(CH)-C_6H_4-(O-CH_2CH_2)_xOH$$

wherein X=1 to 70.

In Triton X-305 X is equal to 30
Triton X-405 X is equal to 40
Triton X-200 has the formula R—O—(E)$_x$—SO$_3$Na
Triton X-301 has the formula R—O—(E)$_x$—OSO$_3$Na
  wherein E is an ether
  and X is 1–70.
Triton 2S-44 is a Triton of the above general formula with a phosphate group.

Other emulsifiers are GR-5 a registered trademark of Rohm and Haas Company, having a formula $$\begin{array}{l} COOC_8H_{17} \\ | \\ CHSO_3Na \\ | \\ CH_2 \\ | \\ COOC_8H_{17} \end{array}$$

and Aerosol A-102 and A-103 a registered trademark of American Cyanamid Co., which are generally disodium ethoxylated alcohol half ester of sulfosuccinic acid and disodium ehtoxylated nomyl phenol half ester of sulfosuccinic acid respectively.

The Triton nonionic surface-active agents are desirable for use as emulsifiers in the preparation of acrylic polymer emulsions. Those Tritons such as Triton X-305 and X-405 function extremely well as primary emulsifiers and result in polymers having the desirable physical properties for use as toners and paints.

Any suitable initiator may be used, typical initiators are potassium persulfate, ammonium persulfate, sodium persulfate and mixtures thereof. The purpose of the initiator is to generate the polymerization by supplying free radicals to the monomeric mixture.

Any suitable modifier may be used, typical modifiers are n-actyl mercaptan, n-dodecyl mercaptan, n-butyl mercaptan, thiophenal, ethyl mercaptoacetate, butanethial, and mixtures thereof. The purpose of the modifier is to control the molecular weight of the polymer being produced by the consumption of the free radicals in the intermediate products.

Any suitable reducing agent may be used, typical reducing agents are sodium dithionite, sodium metabisulfite, potassium dithionite, potassium metabisulfite, sodium bisulfite, sodium hydrosulfite, sodium thiosulfate, sodium formaldehyde sulfoxylate and mixtures thereof. The purpose of the reducing agent in the present invention is to accelerate the production of free radicals through the reduction reaction between initiators and reduction reagents.

DESCRIPTION OF THE PREFERRED EMBODIMENTS

The preferred embodiment is illustrated in the accompanying drawing and description. FIG. IV is a schematic illustration of a system that may be used in the present invention. FIGS. I to III illustrate various means that may be used in the invention as drop regulators to introduce the proper small amount of monomer in the system of this invention.

FIG. I is a drop regulator having a main body 20 made of cork, rubber or any other suitable material. Positioned in body 20 is an aperture 21 which provides an entrance for monomer. The monomer is added through aperture 21 and travels to extensions 22 and adhere by surface tension to tip 23 of extensions and form small droplets depending on radius of tip surface 23. From tip 23, the drops 24 are introduced into resin kettle 3. The larger the size of tip 23, the larger will be the droplets introduced. Extensions 22 may be constructed so that they may be length adjustable and depending on the drop size required, the tip may be varied in size.

FIG. II is another drop regulator useful in this invention. An embodiment of this regulator is produced by Nitro Atomizer Co. of Copenhagen and is described in "Spray Dryiny" by K. Masters, published by Leonard Hill Books a division of International Textbook Company Limited, London England, printed by J. W. Arrowsmith Ltd. of London England, published 1972 page 144-145. In this embodiment the control of drop 24 size distribution is carried out by change in wheel 25 speed. Obviously this atomizer wheel could produce drops of high homogeneity over a wide range of droplet sizes. The wheel is placed on the end of spindle 26 so as to facilitate correct wheel centering, easy mounting and removal. Design of atomizer wheels can vary, the embodiment shown has straight vanes 27; there are usually 18-36 vanes. The straight vanes or channels 27 are easy to use and require no special liquid distribution techniques. The straight vanes 27 are virtually clog-free, but the wheel does pump large quantities of air. If less air is required curved vanes could be used to reduce the amount of occluded air in the product.

FIG. III illustrates a nozzle atomizer 28 useful as the drop regulator of this invention. Drop size and size distribution can be easily controlled using a nozzle atomizer. This type of atomizer is commonly used in milk drying systems and usually produce drops having a size of about 60 microns operating at 100 PSIG (7 atm.) at a feed rate of 10 lb/min or 4.5 kg/min. The nozzle atomizer also provide the best atomizing technique for liquids of long molecular chain structure. Drops 24 can be vaired in size by use of this atomizer, from 10 to about 100 microns. A further description of this atomizer is found in the publication cited in the FIG. II description.

In FIG. IV, the polymerization Apparatus is illustrated having a temperature controlling bath, having a source of heat 2 and a resin kettle 3. In the resin kettle 3 is positioned a themometer 4, a glass stirring rod 5 and a glass tube 6. In the resin kettle 3 is located the reaction mixture 7 comprising the monomer and the emulsifying mixture used and described earlier. Nitrogen is fed through glass tube 6 and bubbled into the reaction mixture 7. A separatory funnel 8 is inserted into tubing 9 for introduction of the reaction mixture into the resin kettle 3. Positioned at the lower end of tubing 9 is the drop regulator 10. The monomer mixture is introduced into separatory funnel 8 and fed into tubing 9 as desired. The monomer then passed through drop regulator 10 which is designed to obtain small drops of monomers in the order of 10 to about 1000 microns. The monomer mix must be added slowing into resin kettle 3, the addition not to exceed about one-fourth to about one-sixth per hour of the final amount of monomer to be added. High concentrations of emulsion polymers ranging from 65% to about 80% are prepared using this slow addition through a specially designed drop regulator 10. The monomer addition method is used to control the heat dissipation and particle size of polymer, about 0.1 to about 1 micron. The emusifiers 6% to about 8% based on the monomer, deionized water, and 10-15% of monomer mixture are mixed in a preferred embodiment to form the emulsion. Other suitable emulsion mixtures may be used. After the addition to the separatory funnel 8 of 4-6 gms. of initiators (0.2-2.5% monomer, ammonium persulfate, and potassium persulfate), the rest of the monomer mixture is slowly added into the resin kettle 3 within about 3-5 hours. The reduction agents such as sodium dithionite, sodium metabisulfite and modifiers like n-octyl mercaptan, n-dodecyl mercaptan are used in some cases. The excess emulsifiers maybe added to stabilize the emulsion through the absorption of the polymer particles, the decrease of surface tension and the formation of the micelles. During the addition of the monomer mixture through drop regulator 10, glass stirring rod 5 at a speed of about 300-400 RPM is actively mixing the mixture in resin keetle 3. A Claisen adaptor 11 supports thermometer 4 and is connected to condenser 12. The purpose of the adaptor 11 and condenser 12 is to provide temperature control, and prevent the escape of water and the monomer mixture. After maintaining the system at a temperature of about 65° C. to about 80° C., for from about 6 to about 8 hours the resulting high concentration of emulsion polymer mixture maybe withdrawn from kettle 3.

The following examples further illustrate preferred embodiments of this invention, parts are by weight unless otherwise specified.

EXAMPLE 1

Single-Step Addition 24 g of deionized water and 128 g of Triton x-200 (28% solid content) are mixed in a 1 liter, fourneck resin kettle and mechanically stirred for 20 minutes under the atmosphere of nitrogen gases. The monomer mixture is acquired by the addition of 365 g of styrene, 152 g of n-butyl acrylate and 91 g of methyl methacrylate in 1 liter Erlenmeyer flask with magnetic stirring. 91 g of monomer mixture is then slowly added into the resin kettle within a one hour period through a 250 ml separatory funnel with a drop-regulator (FIG. 1). After the addition of 20 ml of 20% aqueous ammonium persulfate, containing 6% Triton x-200, and the addition of 20 ml of 20% sodium metabisulfite, the temperature is raised to 60° C. The rest of monomer mixture, 517 g, is then slowly added to the reaction emulsion within 3 hours period while bubbling of nitrogen gases and mechanical stirring (400 rpm) are continuing. The polymerization is completed after heating the reaction mixture for 1.5 hours at 75° C. The final product is slowly cooled to room temperature. A cream emulsion polymer is obtained with a weight of 800 g. This emulsion polymer have solid content around 74%.

EXAMPLE II

Single-Step Addition 160 g of de onized water and 247 g of Aerosol A-103 (34% solid content) are mixed in a 3 liter, four-neck resin kettle and mechanically stirred for 30 minutes under the atmosphere of nitrogen gases. The monomer mixture is obtained by the addition of 683 g of vinyl toluene and 367 g of butyl methacrylate in a 2 liter Erlenmeyer flask with magnetic stirring. 168 g of this monomer mixture is then slowly added into the 3 liter resin kettle within one hour period through a 250 ml separatory funnel with a drop-regulator (FIGS. 1, 2, and 3). After the addition of 20 ml of 20% aqueous potassium persulfate (containing 8% Aerosol A-103) and 20 ml of 20% sodium dithionite the temperature is raised to 70° C. The rest of the monomer mixture, 882 g, is then slowly added to the reaction emulsion within 3 hours period while bubbling of nitrogen gases and mechanical stirring (400 rpm) are continuing. The polymerization is completed after heating the reaction mixture for 1.5 hours at 75° C. The final product is slowly cooled to room temperature. An emulsion polymer is obtained with a weight of 1495 g. This emulsion polymer have solid content around 67%.

EXAMPLE II

Single-Step Addition 50 g of deionized water and 211 g of Aerosol A-103 (34% solid content) are mixed in a 3 liter, four-neck resin kettle and mechanically stirred for 30 minutes under the atmosphere of nitrogen gases. The monomer mixture is obtained by the addition of 585 g of styrene 225 g of butyl methacrylate, and 90 g of methyl methacrylate in a 2 liter Erlermeyer flask with magnetic stirring. 168 g this monomer mixture is then slowly added into the 3 liter resin kettle within a one hour period through a 250 ml separatory funnel with a drop-regulator (FIGS. 1, 2 and 3). After the addition of 20 ml of 20% aqueous ammonium persulfate (containing 8% aerosol A-103) and 20 ml of 20% sodium metabisulfite(containing 8% aerosol A-103) the temperature is raised to 70° C. The rest of the monomer mixture, 732 g, is then slowly added to the reaction emulsion within 5 hours period while bubbling of nitrogen gases and mechanical stirring (400 rpm) are continuing. The polymerization is completed after heating the reaction mixture for 1.5 hours at 75° C. The final product is slowly cooled to room temperature. An emulsion polymer is obtained with a weight of 1200 g. This emulsion polymer have solid content around 74%.

EXAMPLE IV

Multiple Step Addition

The monomer mixture is prepared by the addition of 280 g styrene and 120 g of methyl metharylate in a 1 liter Erlenmeyer flask with magnetic stirring. 40 g of this monomer mixture is then slowly added to a 1 liter resin kettle containing 60 g of Aerosol A-103 (34% solid, from American Cyanamid) in 40 minute through a drop-regulator (FIGS. 1, 2, and 3). After the addition of 2.5 ml (80%) of ammonium persulfate and the addition of 2.5 ml (80%) of sodium dethionite, the temperature is raised to 70° C. 240 g of monomer mixture is slowly added to reaction emulsion within 3 hours. After 3 hour reaction period, 20 ml of Aerosol A-103, 2.5 ml (80% containing 8% Aerosol A-103) of Ammonium persulfate and 2.5 ml of sodium dithionite (80% containing 8% aerosol A-103) are added to 1 liter resin kettle. The rest of monomer, mixture 120 g is then added in the resin kettle within 3 hours period through drop-regulators. 10 ml of Aersol A-103 is then added to the emulsion to stabilize the product. The reaction is completed after 2 more hours warm and stirring at 70° C. The final product is slowly cooled to room temperature while it is stirring. This emulsion polymer product weight 500 g and have solid content around 80%.

EXAMPLE V

Multiple Addition

The monomer mixture is prepared by the addition of 246 g of styrene, 123 g of n-butymethacrylate and 41 g of ethyl acrylate in a 1 liter Erlenmeyer flask with magnetic stirring. 70 g of deionized water and 60 g of Trition x-200, (28% solid from Rohm & Haas) are mixed in a 1 liter resin kettle and stirred for 20 minutes. 40 g of monomer mixture is then slowly added in the resin kettle within half hour through a drop-regulator (FIGS. 1, 2 and 3). After the addition of 6 ml (50%) of potassium persulfate and the addition of 6 ml (50%) of sodium dithionite, the temperature is raised to 70° C. 270 g of monomer mixture is slowly added to the reaction emulsion in 4 hour period. Then 30 ml of Triton x-200, 2 ml of sodium dithionite (50% containing 8% Triton x-200) and 2 ml of ammonium per sulfate (50% containing 8% Triton x-200) are added to the 1 liter resin kettle. The rest of the monomer mixture 100 g is then added in the resin kettle within 2 hours period through drop regulators. 15 ml of Triton x-200 is then added to the emulsion to stabilize the product. The reaction is completed after two more hours, warm and stirring at 70° C. The final product is slowly cooled to room temperature while it is stirring. The final emulsion product have weight 595 g, and 70% solid content.

EXAMPLE VI

Multiple Addition

The monomer mixture is prepared by the addition of 960 g of styrene (or vinyl toluene), 160 g of n-butyl methacrylate (or butyl acrylate) and 480 g of methyl acrylate (or methyl methacrylate) in a 2 liter Erlenmeyer flask with magnetic stirring. 67 g of deionized water and 200 g of Aerosol A-103 (34% solid content) are mixed in a 3 liter resin kettle and stirred for 30 minutes. 240 g of monomer is then slowly added in the resin kettle within half hour through a drop-regulator (FIG. 1 to FIG. 4). After the addition of 20 ml (32%) of Ammonium persulfate and the addition of 20 ml (32%) of sodium potassium metabisulfite, the temperature is raised to 70° C. 1000 g of monomer mixture is slowly added to the reaction emulsion in 4 hours period. Then 83 ml of Aerosol A-103, 5 ml of ammonium persulfate (32% containing 8% Aerosol A-103), 5 ml of potassium metabisulfite (32% containing 8% Aerosol A-103) are added to the 3 liter resin kettle. The rest of the monomer mixture 360 g is then added in the resin kettle within 2 hours period through drop regulators. 83 g of Aerosol A-103 is then added to the emulsion to stabilize the product. The reaction is completed after two more hours warm and stirring at 80° C. The final product is slowly cooled to room temperature while it is stirring. The final emulsion product have weight 2000 g and 78% solid content.

In the above examples the following vinyl monomers can be used in place of the styrene: vinyl toluene or methyl styrene and mixtures. The following acrylates may be used in place of the n-butylmethacrylate of the examples: butyl acrylate, butyl methacrylate, methyl acrylate, methyl methacrylate, acrylic acid, ethyl acrylate, acrylo amide, and mixtures thereof.

Although various embodiments are directed specifically to the above examples, many of the typical materials mentioned above, if suitable, may be substituted in the examples with similar results. Various modifications of this process will become apparent to those skilled in the art upon a reading of this disclosure; these are intended to be encompassed within the scope of this invention.

What is claimed is:

1. A process for the preparation of emulsion polymers having a solid content of about 65% to about 80% which comprises adding a monomeric mixture to a reaction system maintained at a temperature of from about 60° C. to about 90° C., said monomer addition not exceeding an hourly rate of about one-fourth of the total monomer to be added, said mixture comprising monomers having a particle size of from about 10–100 microns, said system having therein an emulsifier and initiator at the time of said monomeric addition.

2. The process of claim 1 wherein an emulsifier is added to said system in an amount of from about 6% to about 10% based on the total monomer in the system.

3. The process of claim 1 wherein said monomer has the general formula:

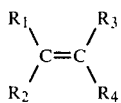

wherein
$R_1$ and $R_2 = H$,
$R_3 = H$, $CH_3$ and mixtures thereof,
$R_4 = COOR$, $CN$, $C_6H_5$, $CH_3-C_6N_5$, $COOH_2OH$ and mixtures thereof.

4. The process of claim 1 wherein said monomer comprises styrene and an acrylate.

5. The process of claim 1 wherein said monomer comprises n-butyl methacrylate and styrene.

6. The process of claim 1 wherein the system is maintained at temperature of from about 65° C. to about 85° C.

7. The process of claim 1 wherein a reducing agent is used in the system.

8. The process of claim 1 wherein an initiator is used in the system.

9. The process of claim 1 wherein a chemical modifier is used in the system.

10. The process of claim 1 wherein an emulsifier and an initiator are used in the system, said emulsifier and initiator are pre-mixed prior to introduction into said system.

11. The process of claim 1 wherein said monomeric addition is conducted both prior to and subsequent to the introduction of an emulsifier and an initiator.

12. The process of claim 1 wherein an emulsifier and an initiator are used in said system, said emulsifier and initiator are pre-mixed prior to introduction into said system, and wherein said monomeric addition into said system is conducted both prior to and subsequent to the initial introduction into said system of said emulsifier-initiator mixture.

* * * * *